United States Patent Office 3,008,978
Patented Nov. 14, 1961

3,008,978
AMINOALKYL CHLOROFORMATES
Thomas K. Brotherton, South Charleston, and John W. Lynn, Charleston, W. Va., assignors to Union Carbide Corporation, a corporation of New York
No Drawing. Filed May 10, 1960, Ser. No. 28,008
2 Claims. (Cl. 260—463)

This invention relates to a new type of aminoalkyl chloroformate.

More specifically, the object of this invention is to prepare the hydrohalide salts of 2-(N,N-diethylamino) ethyl chloroformate.

The chloroformates within the scope of this invention correspond to the formula:

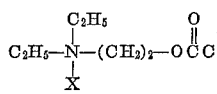

where X is HCl, HBr, HI, HF.

The above chloroformates can be obtained by treating a solution of a hydrohalide salt of 2-(N,N-diethylamino) ethyl alcohol with gaseous phosgene. The inert solvent is not critical and any conventional one can be use. Examples of such solvents include chloroform, chlorobenzene, ethylene dichloride, tetramethylene sulfone, ethers, esters and aliphatic and aromatic hydrocarbons. It is obvious that the length of time required for the reaction to take place is dependent on the rate at which phosgene is introduced into the reaction vessel. The temperature at which the reaction is conducted must be chosen so that the chloroformate being made will not decompose. The temperatures which have been found to be particularly useful are within the range of from $-10$ to $30°$ C.

In carrying out the reaction it is also possible to introduce the phosgene in the form of a solution in an inert solvent as well as in the vapor phase. This is accomplished, for example, by adding a chloroform solution of the alkanolamine hydrohalide salt to a chloroform solution of phosgene at about $0°$ C. It is understood that other solvents can be used such as those previously mentioned. The solvent can be removed from the reaction vessel by any conventional manner such as distillation under reduced pressure at temperatures of from 0 to $30°$ C. This solvent removal technique is equally applicable when phosgene is introduced in the form of a gas.

The alkanolamine used as the starting material is well known in the art and can be prepared in various ways such as by the reaction of an amine with an epoxide:

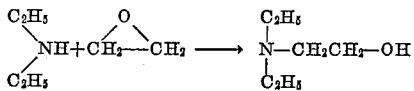

or by the reaction of an amine with chlorohydrins:

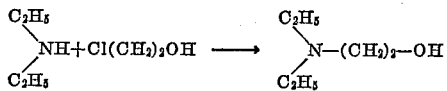

The novel aminoalkyl haloformates are useful in the preparation of epoxides. The epoxides can be prepared in the following manner:

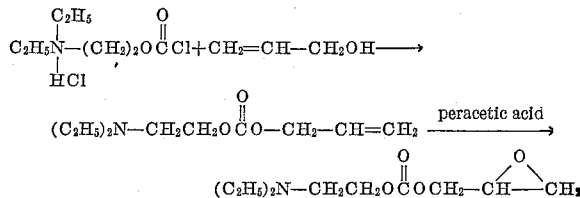

These epoxides are useful as plasticizers for vinyl resins. The hydrohalides of the aminoalkyl chloroformates are also useful to modify starch by the addition of a tertiary amine group to the starch. Additionally, these novel compounds can be used to make blowing agents for vinyl resins in the following manner

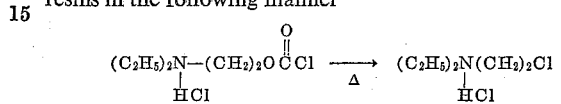

EXAMPLE I

*The hydrochloride of 2-(N,N-diethylamino)ethyl chloroformate*

A chloroform (500 ml.) solution of 2-(N,N-diethylamino)ethanol (58 g., 0.5 mole) was treated with a slight excess of dry hydrogen chloride at $-10°$ to $0°$ C. over a period of one hour. The resulting chloroform solution of the amine hydrochloride was then added dropwise to a chloroform (500 ml.) solution of phosgene (540 g., 5.5 moles) over a period of 25 minutes and at $-20°$ to $-7°$ C. The resulting mixture was stirred for one hour at $-10°$ to $0°$ C., then sparged with nitrogen and, finally, the solvent was removed under reduced pressure at a kettle temperature $<23°$ C. The white, solid residual material (116 g.–108 g. was quantitative yield) was purified by washing with ether. *Analysis.*—Calculated for $C_7H_{15}Cl_2NO_2$: C, 38.9; H, 6.95; N, 6.48. Found: C, 39.05; H, 6.95; N, 6.34. Infrared analysis is in agreement with that of the desired compound.

EXAMPLE II

*The hydrochloride of 2-(N,N-diethylamino)ethyl chloroformate*

A chloroform (300 ml.) solution of 2-(N,N-diethylamino)ethanol (117 g., 1.0 mole) is treated with an equivalent amount of hydrogen chloride at $-10°$ to $10°$ C. The resulting mixture was treated with gaseous phosgene (1.8 moles) at about $0°$ C. for a period of one hour. The dissolved gases were then removed by sparging with nitrogen and the solvent subsequently removed under reduced pressure. The white residual product was found by chlorine analyses to have an equivalent weight of 112.1. (Equivalent weight of desired material is 108.)

What is claimed is:
1. Aminoalkyl haloformates of the formula

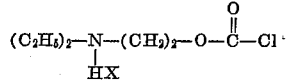

where X is a halogen atom.

2. The hydrochloride salt of 2-(N,N-diethylamino)ethyl chloroformate.

References Cited in the file of this patent
UNITED STATES PATENTS
2,517,965    Bohl  ------------------ Aug. 8, 1950

UNITED STATES PATENT OFFICE
CERTIFICATION OF CORRECTION

Patent No. 3,008,978                                      November 14, 1961

Thomas K. Brotherton et al.

It is hereby certified that error appears in the above numbered patent requiring correction and that the said Letters Patent should read as corrected below.

Column 1, lines 17 to 19, the formula should appear as shown below instead of as in the patent:

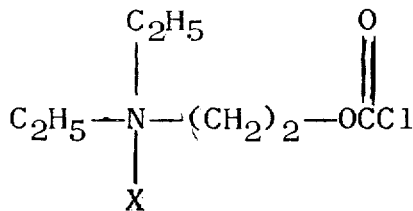

Signed and sealed this 24th day of April 1962.

(SEAL)
Attest:

ESTON G. JOHNSON
Attesting Officer

DAVID L. LADD
Commissioner of Patents